3,759,838
RHODIUM HALIDE COMPLEX CATALYST
COMPOSITIONS
Kenneth C. Dewhirst, San Pablo, Calif., assignor to Shell Oil Company, New York, N.Y.
No Drawing. Continuation-in-part of application Ser. No. 705,582, Nov. 30, 1967, now Patent No. 3,639,439, which is a division of application Ser. No. 417,482, Dec. 10, 1964, now Patent No. 3,489,786. This application June 11, 1971, Ser. No. 152,391
Int. Cl. C07c 11/26; C07d 103/00
U.S. Cl. 252—429 R                        16 Claims

ABSTRACT OF THE DISCLOSURE

An improved homogeneous hydrogenation catalyst composition comprises rhodium halide complexes incorporating stabilizing phosphine or arsine ligands, and excess ligand.

CROSS-REFERENCES TO RELATED APPLICATIONS

This is a continuation-in-part of applicant's copending application Ser. No. 705,582, filed Nov. 30, 1967, now Pat. No. 3,639,439, issued Feb. 1, 1972, said copending application being a division of applicant's application Ser. No. 417,482, filed Dec. 10, 1964, now Pat. No. 3,489,786, issued Jan. 13, 1970.

BACKGROUND OF THE INVENTION

This invention relates to an improved process for the hydrogenation of unsaturated organic compounds, and to a novel catalyst composition employed therein.

The hydrogenation of unsaturated organic compounds by contact with molecular hydrogen in the presence of a hydrogenation catalyst has been extensively investigated. Broadly speaking, such processes are classifiable into two general categories depending upon the physical phase in which the catalyst is present during the hydrogenation process. In one process type, herein referred to as a heterogeneous hydrogenation process, the catalyst is essentially insoluble in the reaction medium. Typical heterogeneous catalysts include transition metals, e.g., nickel, cobalt, platinum, palladium and the like, as well as the oxides thereof, e.g., platinum oxide and palladium oxide, or mixed oxide catalysts such as copper chromite. Heterogeneous hydrogenation catalysts are customarily employed as pure materials in a finely divided state or are alternatively employed supported on inert carriers. Certain difficulties are inherent in heterogeneous catalysis. Among these are problems of maintaining contact between reactants and catalyst in the multiphase reaction system and maintaining catalyst activity in view of the known tendency for the surface of heterogeneous catalysts to become "poisoned" by irreversible adsorption of reactant molecules or impurities in the reaction system, particularly low molecular weight sulfur-containing impurities.

These difficulties are largely overcome by utilization of a homogeneous hydrogenation catalyst, that is, a catalyst which is essentially completely soluble in the reaction medium. Substantially less is known about the formation or operation of homogeneous catalysts. In general, these catalysts are prepared in situ by reduction of a transition metal salt, e.g., an iron or cobalt salt, with an aluminum alkyl or similar reducing agent. Such homogeneous catalysts are generally characterized by instability and short catalyst life, and are neither insoluble nor suitable for storage and subsequent use. In addition, the requirement for in situ formation of catalyst through the use of a reducing agent adds to the process handling difficulty and increases the process cost. It would be of advantage to provide a more satisfactory homogeneous hydrogenation catalyst which is efficiently utilized in a variety of hydrogenation applications.

It is an object of the present invention to provide an improved process for the hydrogenation of unsaturated organic compounds and to provide a novel catalyst composition which is employed in such processes. More particularly it is an object to provide a novel homogeneous hydrogenation catalyst composition and the consequently improved homogeneous hydrogenation process which employs this catalyst composition.

SUMMARY OF THE INVENTION

It has now been found that these objects are accomplished by the provision of catalyst compositions comprising certain rhodium halide complexes containing organic complexing ligand and an excess of ligand. Although the rhodium halide-organic ligand complex is itself useful as a hydrogenation catalyst, the presence of excess ligand in the catalyst composition greatly increases catalyst life and thereby increases the efficiency of the rhodium halide complex as a hydrogenation catalyst. The compositions of the invention are eminently suited for catalyzing the hydrogenation of numerous unsaturated organic molecules and exhibit utility in applications wherein prior homogeneous catalysts have not been suitable.

DESCRIPTION OF PREFERRED EMBODIMENTS

The rhodium halide complex employed in the process of the invention comprises a rhodium atom bonded to at least one halide substituent and complexed with at least two complexing ligands. Without wishing to be bound by any specific theory, it is apparent that the rhodium halide complex undergoes chemical changes during its participation in a hydrogenation process, so that no one formula suitably describes the actual catalytic species. In one modification of the process of the invention, catalyst is introduced in a form represented by the formula

wherein L represents the complexing ligand and X is halogen. Although alternate methods are available for calculating the oxidation state of the rhodium in the above complex, this form of the catalyst is herein referred to as a rhodium (III) halide complex. It is considered likely that under the conditions of the hydrogenation processes wherein the catalyst is utilized, i.e., in contact with molecular hydrogen, the rhodium (III) halide complex is reduced to a complex containing rhodium in a lowered oxidation state, herein termed a rhodium (I) complex and represented by the formula

wherein L and X have the previously stated significance. In the modification of the process of the invention wherein catalyst is introduced as the rhodium (I) halide complex, hydrogenation is observed at a rate essentially identical to the rate observed when the catalyst is provided as the corresponding rhodium (III) halide complex.

It is thought probable that the rhodium (I) halide complex functions during the hydrogenation process as a "hydrogen carrier" through an increase in the coordination number of rhodium, e.g., from a coordination number of four to a coordination number of six, through reaction with hydrogen, probably forming a species represented by the formula

wherein L and X have the previously stated significance. Complexes of this type are also likely formed by replacement of two halogen substituents of an added rhodium (III) halide complex through reaction with hydrogen. Transfer of the hydrogen to an unsaturated organic molecule which may also become transiently complexed with the rhodium results in a return to rhodium with the lower coordination number whereupon the cycle is repeated.

It is therefore apparent that a number of related rhodium halide complexes of varying numbers of halogen and hydrogen substituents are utilizable as catalyst or catalyst precursor. These complexes are generically classified as a rhodium complex containing three molecules of stabilizing ligand as will be defined hereinbelow for each atom of rhodium, at least one halide substituent on each rhodium, up to two hydrogen substituents on each rhodium, with the number of halide substituents plus the number of hydrogen substituents present in the rohdium complex molecule not exceeding three. A preferred class of such rhodium complexes is represented by the formula

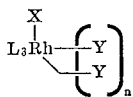

wherein L is the stabilizing ligand, X is halogen, Y is independently selected from hydrogen and X, and $n$ is a whole number from 0 to 1 inclusive. In the above formula, X is suitably halogen of atomic number from 9 to 53, that is, the halogens fluorine, chlorine, bromine, and iodine. Preferred, however, are the halogens of atomic number from 17 to 35, i.e., the middle halogens chlorine and bromine, and best results are obtained when the rhodium halide complex contains chlorine as the X group(s).

The term L in the above formulas independently represents the ligand employed to stabilize the rhodium halide complex and is additionally although independently representative of the excess ligand employed in the catalyst composition of the invention. Although ligands such as carbonyl, olefin, nitrosyl, phenol, and thiophenol are in part operable, the preferred ligand L is a trisorgano derivative of an element of Group Va of the Periodic Table having an atomic number of from 15 to 33, i.e., phosphorus and arsenic, characterized by each valence of the Group Va element being satisfied by a bond to a carbon atom of the organo moiety. Thus, the preferred complexing ligands are phosphines or arsines and are represented by the formula $$R_3E$$

wherein E is the Group Va element of atomic number from 15 to 33 and R independently is an organo group having from 1 to 20 carbon atoms, preferably 1 to 10, and having only aromatic unsaturation. R is therefore saturated aliphatic, including cycloalphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen, and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of non-hydrocarbyl substituents comprises an atom having an atomic number from 7 to 8, i.e., nitrogen or oxygen, one valence of which is satisfied by bonding to an otherwise hydrocarbyl E substituent, and the remaining valence(s) are satisfied by bonding to lower alkyl radicals which are alkyl of from 1 to 4 carbon atoms. Such preferred non-hydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopenyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl, and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m - trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5 - bis(trichloromethyl)phenyl and 3-dibutylaminophenyl.

In the $R_3E$ ligand as defined above, the R moieties are the same or are different, although ligands wherein all R groups are the same are generally preferred. Exemplary R groups include phosphines such as triethylphosphine, tributylphosphine, triphenylphosphine, tris(4-methoxyphenyl)phoshine, tris(4-tolyl)phosphine, tris(3-chlorophenyl)phosphine, tris(4 - dimethylaminophenyl) phosphine, diphenylhexylphosphine, dimethyl(3-methoxyphenyl)phosphine, dibutylstearylphosphine, tribenzylphosphine, cyclohexyldibutylphosphine and the like; and arsines such as triphenylarsine, ditolylphenylarsine, tris (4-ethoxyphenyl)arsine, diphenylcyclohexylarsine, dibutylphenylarsine, and the like. In general, phosphine ligands are preferred over analogous arsine ligands, and ligands wherein the phosphorus substituents are aromatic are generally preferred over wholly aliphatic phosphine ligands. Largely because of economic reasons, triphenylphosphine is a particularly preferred ligand.

The rhodium halide complex catalyst is prepared by several methods. In one preferred modification, a rhodium trihalide salt is mixed with a three-fold molar amount of the complexing ligand in an alcoholic solvent, particularly a lower alkanolic solvent such as methanol, ethanol, propanol, butanol and the like, at temperatures from about 20° C. to about 140° C. The type of catalyst complex that results will in part depend upon the ability of the complexing ligand to stabilize the rhodium in its higher oxidation state. When diphenylmethylarsine is employed as a complexing ligand, the rhodium (III) halide complex formed is stable, and is recovered from the mixture by conventional methods such as solvent removal by distillation at reduced pressure or by selective crystallization. From diphenylmethylarsine and rhodium (III) chloride, for example, are produced trichlorotris(diphenylmethylarsine)rhodium (III). Such preparations are described by Chatt et al., J. Chem. Soc., 2508 (1964) and by Lewis et al., Chem. and Ind., 1386 (1960). Certain suitable complexing ligands, particularly the phosphines, do not readily stabilize the rhodium in the higher oxidation state in alcoholic solution and the resulting complex contains rhodium in the lower oxidation state, i.e., the +1 oxidation state. For example, reaction of triphenylphosphine and rhodium (III) chloride in ethanolic solution results in the formation of chlorotris (triphenylphosphine)rohdium (I). When the lower valent-rohdium complexes are formed, the complex is customarily observed as a precipitate and is recoverable as by filtration. An alternate procedure for formation of the rhodium complexes is by ligand exchange in the hydrogenation process reaction medium. This in situ formation of catalyst complex comprises the addition of a stable rhodium complex and an excess of the ligand whose introduction into the catalyst is desired. For example, addition of trichlorotris(diphenylmethylarsine)rohdium (III) and excess triphenylphosphine to the hydrogenation process reaction medium forms in situ a catalyst which operates in the manner of trichlorotris(triphenylphosphine)rhodium (III).

In the hydrogenation process of the invention, the rhodium halide complex is employed in conjunction with an excess of stabilizing ligand which is the same stabilizing ligand present in the rhodium halide complex as introduced or alternatively is a different member of the class of stabilizing ligands as previously defined, e.g., as in an in situ formation of the desired rhodium halide complex catalyst. The amount of excess stabilizing ligand employed is of some criticality in obtaining the optimum catalyst composition. Too little excess stabilizing ligand is not sufficiently effective in maintaining catalyst activity, while too great an excess of stabilizing ligand actually retards the hydrogenation process, apparently through prevention of the necessary chemical transformations undergone by the catalyst complex during the hydrogenation process. Molar ratios of excess stabilizing ligand to rhodium halide complex from about 10:1 to about 150:1 are generally satisfactory, although molar ratios from about 20:1 to about 100:1 are preferred.

In the hydrogenation process of the invention, the catalyst composition is employed to catalyze the homogeneous hydrogenation of an unsaturated organic molecule by contact with molecular hydrogen. The advantage observed in the present process resides in the efficient catalysis of hydrogenation rather than in the hydrogenation of any particular type of unsaturated compound, as the process is broadly applicable to the hydrogenation of a number of types of unsaturated organic molecules. In general, the unsaturated molecules employed in the hydrogenation process of the invention contain from 2 to 20 carbon atoms and contain from 1 to 4 non-aromatic carbon-carbon multiple bonds which are preferably ethylenic. A principal advantage gained through utilization of the catalyst compositions of the invention resides in the observed selectivity toward hydrogenation of non-aromatic carbon-carbon unsaturation in the presence of unsaturation of other types. Thus, the hydrogenation process is applied to the hydrogenation of unsaturated molecules containing aromatic unsaturation or unsaturated non-hydrocarbyl functional groups such as cyano, carbonyl, sulfonyl, and the like with consequent efficient saturation of the non-aromatic carbon-carbon unsaturation and little or no effect on the unsaturation of the other types. For example, hydrogenation of acrylonitrile under the conditions of the process of the invention results in the production of high yields of propionitrile with little or no attendant reduction of the cyano moiety.

Illustrative of suitable substrates containing non-aromatic carbon-carbon ethylenic unsaturation are hydrocarbons such as ethylene, propylene, 1-butene, 1-hexene, 3-octene, cyclopentane, cyclooctadiene, propenylbenzene, biallyl, 2-dodecene, butadiene, isoprene, trivinylbenzene, 2,6,8-octadecatriene and vinylcyclohexene; unsaturated nitriles such as acrylonitrile, 4-cyanobutene, 2-methyleneglutaronitrile and methacrylonitrile; unsaturated carbonylic compounds such as methyl vinyl ketone, propyl isopropenyl ketone, crotonaldehyde and cinnamic aldehyde; unsaturated sulfones such as methyl vinyl sulfone, phenyl butadienyl sulfone, and sulfolene; and unsaturated amides such as N,N-dimethacrylamide.

The rhodium halide complex is employed in catalytic quantities. Amounts of rhodium complex from about 0.00001% mole to about 1% mole based upon the material to be hydrogenated are generally satisfactory although amounts of rhodium halide complex from about 0.0001% mole to about 0.1% mole on the same basis are preferred.

The hydrogenation process is typically conducted in liquid-phase solution in the presence or the absence of an inert solvent that is non-hydrogenatable under the conditions of the reaction. Illustrative solvents include hydrocarbons free from non-aromatic unsaturation such as benzene, toluene, xylene, cumene, isooctane, cyclohexane, and methylcyclopentane; nitriles such as propionitrile, acetonitrile and benzonitrile; sulfones such as sulfolane, diethyl sulfone and methyl butyl sulfone; ethers including dialkyl ethers such as diethyl ether, dibutyl ether and propyl hexyl ether, lower alkyl ethers (full) of polyhydric alcohols and poly(oxyalkylene)glycols such as dimethoxyethane, glycerol triethyl ether, diethylene glycol dimethyl ether and tetraethylene glycol diethyl ether; alcohols including lower alkanols such as ethanol, isopropanol, sec-butanol and hexanol, as well as ether-alcohols, e.g., the Cellosolves and the carbitols; and phenols including phenol, p-chlorophenol, m-ethylphenol and m-bromophenol. It is, of course, within the contemplated scope of the process of the invention to employ no reaction solvent as when the catalyst composition is soluble in the unsaturated organic reactant.

The hydrogenation process is typically conducted by mixing the material to be hydrogenated, the solvent, the rhodium halide complex and the excess stabilizing ligand in an autoclave or similar pressure vessel and pressurizing the reactor with hydrogen. The method of mixing is not material. One reaction component may be added to the others in increments, although it is equivalently useful to initially mix the entire amounts of reaction mixture components. The hydrogenation process is conducted at convenient temperatures and at an atmospheric or superatmospheric pressure of hydrogen. Suitable reaction temperatures vary from about 0° C. to about 180° C., the optimum temperature depending in part upon the particular catalyst complex and unsaturated organic material employed. Best results are obtained when the reaction temperature is from about 20° C. to about 130° C. Hydrogen pressures from about 1 atmosphere to about 200 atmospheres are generally satisfactory and the reaction pressure range from about 40 atmospheres to about 100 atmospheres of hydrogen is preferred.

Subsequent to reaction, the product mixture is separated and the desired product is recovered by conventional means such as fractional distillation, selective extraction, crystallization, chromatographic techniques and the like.

The products of the hydrogenation process are organic compounds wherein the ethylenic linkage present in the reactant molecule has been saturated by the addition of a molecule of hydrogen thereto. Illustrative hydrogenation products include propionitrile produced by hydrogenation of acrylonitrile, n-hexane produced by hydrogenation of 1-hexene and sulfolane produced by the hydrogenation of sulfolene. As previously stated, the process of the invention is characterized by efficient reduction of non-aromatic carbon-carbon unsaturation with little or no tendency toward hydrogenation of other types of unsaturation present in the reactant molecule.

To further illustrate the improved method of hydrogenation and the novel catalyst compositions employed therein, the following examples are provided. It should be understood that the details thereof are not to be regarded as limitations, as they may be varied as will be understood by one skilled in this art.

Example I

In 100 ml. of ethanol was dissolved 1.0 g. of rhodium trichloride, aided by gentle warming, and 6.0 g. of triphenylphosphine were added. The reaction mixture was stirred overnight and filtered to give 3.2 g. (92% of theory) of chlorotris(triphenylphosphine)-rhodium (I), an orange-red product, M.P. 223° C. This product is believed to be a novel compound. The elemental analysis was as follows:

*Analysis.*—Calcd. (percent wt.): C, 69.5; H, 4.9; Rh, 11.2; Cl, 3.8. Found (percent wt.): C, 70.2; H, 4.9; Rh, 11.2; Cl, 3.1.

Example II

To an autoclave were charged 6.73 g. of 1-hexene, 20 ml. of propionitrile, 10.0 mg. of trichlorotris(phenyldiethylarsine)rhodium (III) and 0.25 g. of triphenylphosphine. The reactor was charged with hydrogen to a pressure of 1000 p.s.i.g. at 90° C. The course of the hydrogenation was followed by the decrease in hydrogen pressure, and the hydrogen uptake ceased after about 30 minutes, at which time gas-liquid chromatographic analysis indicated a 96% yield of hexane.

Example III

In an autoclave were mixed 8.0 g. of acrylonitrile, 25 mg. of chlorotris(triphenylphosphine)rhodium (I) and 0.25 g. of triphenylphosphine and the reactor was pressurized to 1000 p.s.i.g. with hydrogen at a temperature of 40° C. Hydrogen uptake ceased after two hours and gas-liquid chromatographic analysis of the product mixture indicated a 100% yield of propionitrile.

Example IV

To an autoclave were charged 28 g. of acrylonitrile, 0.5 mg. of trichlorotris(diphenylmethylarsine)rhodium (III) and 50 mg. of triphenylphosphine. The reactor was pressurized with hydrogen to 1000 p.s.i.g. at 140° C. Hydrogen uptake ceased after 32 hours and gas-liquid chromatographic analysis of the product mixture indicated a near-quantitative yield of propionitrile.

Example V

To an autoclave were charged 2.5 g. of methyl vinyl sulfone, 5 ml. of propionitrile, 50 mg. of (1-cyanoethyl)dichlorotris(diphenylmethylarsine)rhodium (III) and 0.25 g. of triphenylphosphine. The reactor was pressurized with hydrogen to 1000 p.s.i.g. at a temperature of 100° C. Hydrogen uptake was complete in aproximately 15 minutes. Gas-liquid analysis of the product mixture indicated no starting material was present. The product mixture was concentrated, diluted with ether and filtered to give 2.0 g. of methyl ethyl sulfone, M.P. 36° C., which represented a yield of 80%. The infrared and nuclear magnetic resonance spectra were consistent with the above formula.

Example VI

To illustrate the advantages gained by utilization of the catalyst complex of the invention, comparative experiments were conducted.

In an autoclave were mixed 250 mg. of (1-cyanoethyl)dichlorotris(diphenylmethylarsine)rhodium (III) and 5 ml. of acrylonitrile. The vessel was pressurized to 1000 p.s.i.g. with hydrogen at 100° C. Hydrogen uptake ceased after 18 hours and the liquid product analyzed 50% acrylonitrile and 50% propionitrile by gas-liquid chromatographic analysis. A yellow precipitate was present which possessed no catalytic activity.

The reaction was repeated employing only 100 mg. of the rhodium complex catalyst, 10 ml. of acrylonitrile, and in addition, 500 mg. of triphenylphosphine. When the reactor was pressurized to 1000 p.s.i.g. with hydrogen at 100° C., the reaction was complete in less than 10 minutes. Gas-liquid chromatographic analysis indicated a 97% yield of propionitrile.

Example VII

The effect of varying the solvent in the hydrogenation of acrylonitrile was determined by conducting a series of hydrogenations employing 10 ml. of acrylonitrile, 20 mg. of trichlorotris(diphenylmethylarsine)rhodium (III), 500 mg. of triphenylphosphine and 20 ml. of solvent. The rate of hydrogenation at 40° C. and 1000 p.s.i.g. hydrogen pressure was determined by following the decrease in hydrogen pressure. The results of this series is given in Table I wherein the number given is the relative rate of acrylonitrile hydrogenation in the particular solvent, based upon an arbitrary value of 100 for hydrogenation in propionitrile.

TABLE I

| Solvent: | Relative rate |
|---|---|
| m-Cresol | 600 |
| Propionitrile | 100 |
| Sulfolane | 50 |
| Toluene | 40 |
| Ethanol | 40 |
| Diethylene glycol dimethyl ether | 20 |

Example VIII

To determine the effect of varying the calculated oxidation state of the rhodium in the added catalyst complex, comparative hydrogenations of 1-hexene were conducted at 70° C. under an initial hydrogen pressure of 1000 p.s.i.g. In each case, 10 ml. of 1-hexene in 20 ml. of propionitrile were employed. In one experiment, the catalyst composition added consisted of 10.0 mg. of trichlorotris(diphenylmethylarsine)rhodium (III) and 250 mg. of triphenylphosphine. In a second experiment, the catalyst composition added consisted of 10.0 mg. of chlorotris(triphenylphosphine)rhodium (I) and 250 mg. of triphenylphosphine. The rates of hydrogenation observed in the two experiments were identical.

Example IX

To determine the effect of varying the halogen substituent present in the rhodium halide complex, a series of 1-hexene hydrogenations was conducted using 10 mg. of a rhodium halide complex of the type trihalotris(diphenylmethylarsine)rhodium (III) and 250 mg. of triphenylphosphine. In each case, 10 ml. of 1-hexene and 20 ml. of propionitrile were employed. The hydrogenations were conducted at 1000 p.s.i.g. of hydrogen pressure, and the relative rate of hydrogenation was determined by decrease in hydrogen pressure. The results are shown in Table II.

TABLE II

| Halogen | Reaction temp.,° C. | Relative Rate |
|---|---|---|
| Cl | 70 | 100 |
| Br | 71 | 87 |
| I | 90 | 47 |

Example X

By a procedure similar to that of Example VIII, second experiment, comparative hydrogenations were conducted varying the Group Va element present in the added ligand. Satisfactory hydrogenation was observed when triphenylphosphine was employed at 70° C. and when triphenylarsine was employed at 102° C. When triphenylamine and triphenylstibine were employed at 129° C. and 157° C., respectively, rhodium metal was deposited from solution and no hydrogenation was observed.

Example XI

By a procedure similar to that of Example VIII, second experiment, a series of experiments were conducted employing other phosphines and arsines as the ligand added. The relative rates of reaction were measured relative to the rate of hydrogenation in the presence of triphenylphosphine, to which rate was assigned an arbitrary value of 100. The results are shown in Table III.

TABLE III

| Ligand | Reaction temp, °C. | Relative Rate |
|---|---|---|
| Triphenylphosphine | 70 | 100 |
| Tris(p-methoxyphenyl)phosphine | 70 | 149 |
| Tris(p-dimethylaminophenyl)phosphine | 70 | 116 |
| Tri(p-tolyl)phosphine | 70 | 118 |
| Tris(p-phenylphenyl)phosphine | 90 | 68 |
| Tris(p-trifluoromethylphenyl)phosphine | 90 | 14 |
| Tris(2,4-dimethylphenyl)phosphine | 120 | 10 |
| Diphenylbutylphosphine | 99 | 9.2 |
| Dibutylphenylphosphine | 120 | 2.6 |
| Triphenylarsine | 102 | 10 |
| Tributylphosphine | 130 | 1.9 |

Example XII

In 10 ml. of benzene were dissolved 1.0 g. of chlorotris(triphenylphosphine)rhodium (I), and 0.5 g. of triphenylphosphine. The reaction mixture was heated at 50° C. under hydrogen pressure and then filtered to give chlorodihydridotris(triphenylphosphine)rhodium (III), a pale yellow product, which after being washed with benzene had a M.P. of 227° C. (dec.). This product is believed to be a novel compound. The elemental analysis, calculated for $C_{54}H_{47}RhClP_3$, was as follows:

*Analysis.*—Calc. (percent wt.): C, 70.1; H, 5.1; Rh, 11.0; Cl, 3.8. Found (percent wt.): C, 70.9; H, 5.2; Rh, 10.8; Cl, 3.7.

The dihydride is also obtained from trichlorotris(phenyldiethylarsine)rhodium (III) by treatment with hydrogen in the presence of triphenylphosphine and 2 molar equivalents of pyridine.

Example XIII

To illustrate the advantages, gained by utilization of the catalyst complex of the invention, comparative experiments were conducted.

In an autoclave were mixed 20 mg. of chlorotris(triphenylphosphine)rhodium (I) and 10 ml. of acrylonitrile. The vessel was pressured to 600 p.s.i.g. with hydrogen at 100° C. Little activity was detected and a solid precipitate was formed at the end of the reaction.

When the above reaction was conducted in the presence of 80 mg. of triphenylphosphine, hydrogen was taken up smoothly at an initial rate of 44 mmoles/hr. to produce propionitrile.

Similar results were obtained in experimentation conducted with trichlorotris(phenyldiethylarsine)rhodium (III) and with chlorodihydridotris(triphenylphosphine)rhodium (III).

I claim as my invention:

1. A catalyst composition consisting essentially of
   (a) rhodium halide complex represented by the formula

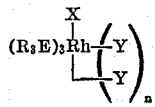

wherein X is halogen of atomic number from 9 to 53, Y is selected from the group consisting of hydrogen and X, $n$ is a whole number from 0 to 1 inclusive, E independently is Group Va element of atomic number from 15 to 33 and R independently is an organo group of from 1 to 20 carbon atoms, is free from aliphatic carbon-carbon unsaturation, is bonded to said E atom by a carbon-E bond and is selected from the group consisting of hydrocarbyl saturated aliphatic, hydrocarbyl saturated cycloaliphatic, hydrocarbyl aromatic, substituted-hydrocarbyl saturated aliphatic, substituted-hydrocarbyl saturated cycloaliphatic and substituted-hydrocarbyl aromatic wherein the substituents of said substituted-hydrocarbyl moieties are free from aliphatic carbon-carbon unsaturation and are selected from the group consisting of alkoxy, carbalkoxy, trihalomethyl, halo, dialkylamino and alkanoyloxy; and
   (b) from about 10 moles to about 150 moles of $R_3E$ per mole of said rhodium halide complex.

2. The composition of claim 1 wherein Y is X.
3. The composition of claim 1 wherein Y is hydrogen.
4. The composition of claim 2 wherein the rhodium halide complex has the formula $$(R_3E)_3RhX$$

and R has from 1 to 10 carbon atoms.

5. The composition of claim 4 wherein X is halogen of atomic number of from 17 to 35.
6. The composition of claim 4 wherein X is chlorine.
7. The composition of claim 6 wherein E is phosphorus.
8. The composition of claim 7 wherein $R_3E$ is triphenylphosphine.
9. The composition of claim 7 wherein $R_3E$ is tris(p-methoxyphenyl)phosphine.
10. The composition of claim 2 wherein the rhodium halide complex has the formula $$(R_3E)_3RhX_3$$

and R has from 1 to 10 carbon atoms.

11. The composition of claim 10 wherein X is halogen of atomic number of from 17 to 35.
12. The composition of claim 10 wherein X is chlorine.
13. The composition of claim 10 wherein E is phosphorus.
14. The composition of claim 12 wherein $R_3E$ is aromatic phosphine.
15. The composition of claim 14 wherein $R_3E$ is triphenylphosphine.
16. The composition of claim 14 wherein $R_3E$ is tris(p-methoxyphenyl)phosphine.

References Cited

UNITED STATES PATENTS

| 3,110,474 | 11/1963 | Mullineaux | 252—429 R X |
| 3,102,899 | 9/1963 | Cannell | 252—429 R X |
| 3,523,962 | 8/1970 | Ottmann et al. | 252—429 R X |
| 3,549,713 | 12/1970 | Charman | 252—429 R X |
| 3,640,898 | 2/1972 | Su | 252—429 R |
| 3,641,076 | 2/1972 | Booth | 252—429 R X |

PATRICK P. GARVIN, Primary Examiner

U.S. Cl. X.R.

260—465.1, 607 A, 683.9, 690, 593 R, 601 R